US012324502B2

(12) United States Patent
White

(10) Patent No.: US 12,324,502 B2
(45) Date of Patent: Jun. 10, 2025

(54) WHEELCHAIR-ADAPTABLE SUPPORT BRACE AND INFLATABLE SHAMPOO CAPE FOR HAIR WASHING AND GROOMING

(71) Applicant: Ingrid Suzette Riley White, Stone Mountain, GA (US)

(72) Inventor: Ingrid Suzette Riley White, Stone Mountain, GA (US)

( * ) Notice: Subject to any disclaimer, the term of this patent is extended or adjusted under 35 U.S.C. 154(b) by 189 days.

(21) Appl. No.: 18/215,182

(22) Filed: Jun. 28, 2023

(65) Prior Publication Data

US 2025/0000239 A1 Jan. 2, 2025

(51) Int. Cl.

*A45D 44/08* (2006.01)
*A45D 44/10* (2006.01)
*A61G 5/12* (2006.01)
*A45D 19/10* (2006.01)

(52) U.S. Cl.

CPC ............ *A45D 44/08* (2013.01); *A45D 44/10* (2013.01); *A61G 5/121* (2016.11); *A45D 19/10* (2013.01)

(58) Field of Classification Search

CPC ........ A45D 44/08; A45D 44/10; A45D 19/10; A61G 5/121
USPC ........................................................ 4/520
See application file for complete search history.

(56) References Cited

U.S. PATENT DOCUMENTS 2,357,461 A * 9/1944 Ellinger ................ A45D 44/08 15/257.01
3,164,151 A * 1/1965 Vere Nicoll ........ A61F 5/05816 602/18
3,863,343 A * 2/1975 Malmin ................ A61B 46/00 2/48
4,606,358 A * 8/1986 Higgins ................ A45D 44/08 132/212
2007/0136941 A1* 6/2007 Giardina ............... A45D 44/02 4/515
2008/0060109 A1* 3/2008 Ottah .................... A45D 44/08 2/50

* cited by examiner

*Primary Examiner* — Huyen D Le

(57) ABSTRACT

The present invention is an assistive device designed to facilitate the hair washing and grooming process for individuals seated in wheelchairs or other mobile chairs. The invention comprises an inflatable shampoo cape and an adjustable support brace. The cape is configured to surround and support the client's neck and to bridge the gap to the sink or shampoo bowl. The cape catches hair and product during a hair service. The support brace, attached to the wheelchair, provides a sturdy base for the cape and is adjustable to meet the height requirements of the sink and the client. The device includes a mount that couples the brace to a wheelchair, designed to fit various wheelchair types and sizes. In an alternative embodiment, the entire construction is made from an inflatable plastic sheet. The invention significantly improves the hair washing and grooming experience for wheelchair users by providing comfortable, secure support and full coverage, while being highly portable and adaptable to different environments.

9 Claims, 2 Drawing Sheets

WHEELCHAIR-ADAPTABLE SUPPORT BRACE AND INFLATABLE SHAMPOO CAPE FOR HAIR WASHING AND GROOMING

FIELD OF INVENTION

The present invention relates generally to the field of assistive devices, and more particularly, to a wheelchair support brace and shampoo cape designed to provide secure, sturdy support and coverage for a client in a wheelchair at a shampoo sink or standard salon shampoo bowls.

BACKGROUND

In the context of personal grooming and hygiene, it is important to accommodate all clients, regardless of their physical abilities or constraints. People with mobility limitations, such as those confined to wheelchairs, often face significant challenges in engaging in common activities such as getting their hair washed or cut. One common problem is the difficulty and discomfort in leaning backwards over a shampoo sink, due to physical limitations or risk of injury.

Conventionally, a hair washing process for wheelchair users often involves a complicated and uncomfortable process. The user may need to transfer from their wheelchair to a salon chair, often with the assistance of others. This transfer process can be challenging, uncomfortable, risky, and, in some cases, may be practically impossible. It is also not ideal for the individual's dignity, comfort, and safety. Furthermore, in many instances, the salon chairs and shampoo bowls are not designed to accommodate wheelchairs, making it even more challenging for these individuals to receive the services they need.

A number of attempts have been made to address these issues. Some of these attempts have included inflatable shampoo basins designed to be used while the individual is lying down, portable shampoo trays, or adjustable height shampoo bowls. However, these solutions have their own limitations. For example, they may not be sturdy enough, require awkward positioning, cause discomfort, or fail to adequately prevent water and hair products from splashing and creating a mess.

Additionally, these solutions often don't provide sufficient neck support, or effectively bridge the gap between the client's neck and the sink or shampoo bowl. This can create additional discomfort and potential strain for individuals with mobility issues, and may even heighten the risk of injury. The lack of a secure fit and proper support can lead to water leakage and a lack of control over the hair washing process.

Moreover, most existing solutions do not offer adequate portability and adaptability to different environments and sinks. They are often bulky, difficult to transport, and not universally adaptable to fit all wheelchair types and sizes. In some cases, they require permanent installation or modification of the existing infrastructure, which is not always feasible, particularly for home use or in facilities with limited space or resources.

Furthermore, the assembly and disassembly of these devices can be time-consuming and complicated, requiring specialized knowledge or additional tools. This is a significant disadvantage, particularly for individuals who live alone or do not have access to assistance.

Thus, there exists a significant need for a more efficient, comfortable, and versatile solution to accommodate individuals in wheelchairs for hair washing and grooming processes. The solution should provide sturdy support, full coverage, and proper neck positioning while also being portable, adjustable, and universally adaptable to various environments and wheelchair sizes.

It is within this context that the present invention is provided.

SUMMARY

The present invention is directed to a wheelchair support brace and a shampoo cape designed to offer a more comfortable, secure, and efficient solution for the hair washing and grooming process of individuals confined to wheelchairs or other types of mobile chairs. The invention combines functionality, ease of use, and comfort, ensuring that individuals with mobility issues can have a dignified and convenient grooming experience.

In one embodiment, the invention comprises a shampoo cape that is highly portable and provides full support and coverage to the neck of a disabled person. The cape comprises an inflatable sheet configured to surround and support the client's neck, bridging the gap to the sink or shampoo bowl when the client is seated in the wheelchair. The cape serves dual functionality: it provides necessary support to the individual's head and neck and catches hair and product that may fall during the hair service. The cape may be constructed from a variety of materials, including but not limited to vinyl or plastic.

The cape is attached to a support brace that is connected to the wheelchair or other mobile chairs. The support brace provides a sturdy base for the cape while accommodating the back of the wheelchair. The brace is adjustable and can be moved up or down to meet the height requirements of any sink or the client being served.

The brace, generally constructed of an adjustable rectangular metal frame, has a curved edge designed to support the back of the client's neck in an ergonomic manner, emulating the curve of a standard shampoo bowl. The mount that couples the brace to the chair is designed to be universal, fitting various wheelchair types and sizes. The design of the brace eliminates the space between the chair and the sink, enhancing the overall comfort and efficiency of the hair washing process.

In an alternative embodiment, the entire construction may be made of an inflatable plastic sheet. This construction includes the support brace structure and the cape that bridges the gap between the neck and the sink, making the device even more portable and convenient for a wide range of environments, including home use and professional salons.

In essence, the invention provides a versatile, efficient, and comfortable solution for individuals in wheelchairs to receive hair washing and grooming services. It offers a significant improvement over existing systems, addressing many of the limitations and discomfort associated with conventional systems.

These and other objectives of the present invention will become apparent from the detailed description to follow, together with the accompanying drawings.

BRIEF DESCRIPTION OF THE DRAWINGS

Various embodiments of the invention are disclosed in the following detailed description and accompanying drawings.

Figure 1:
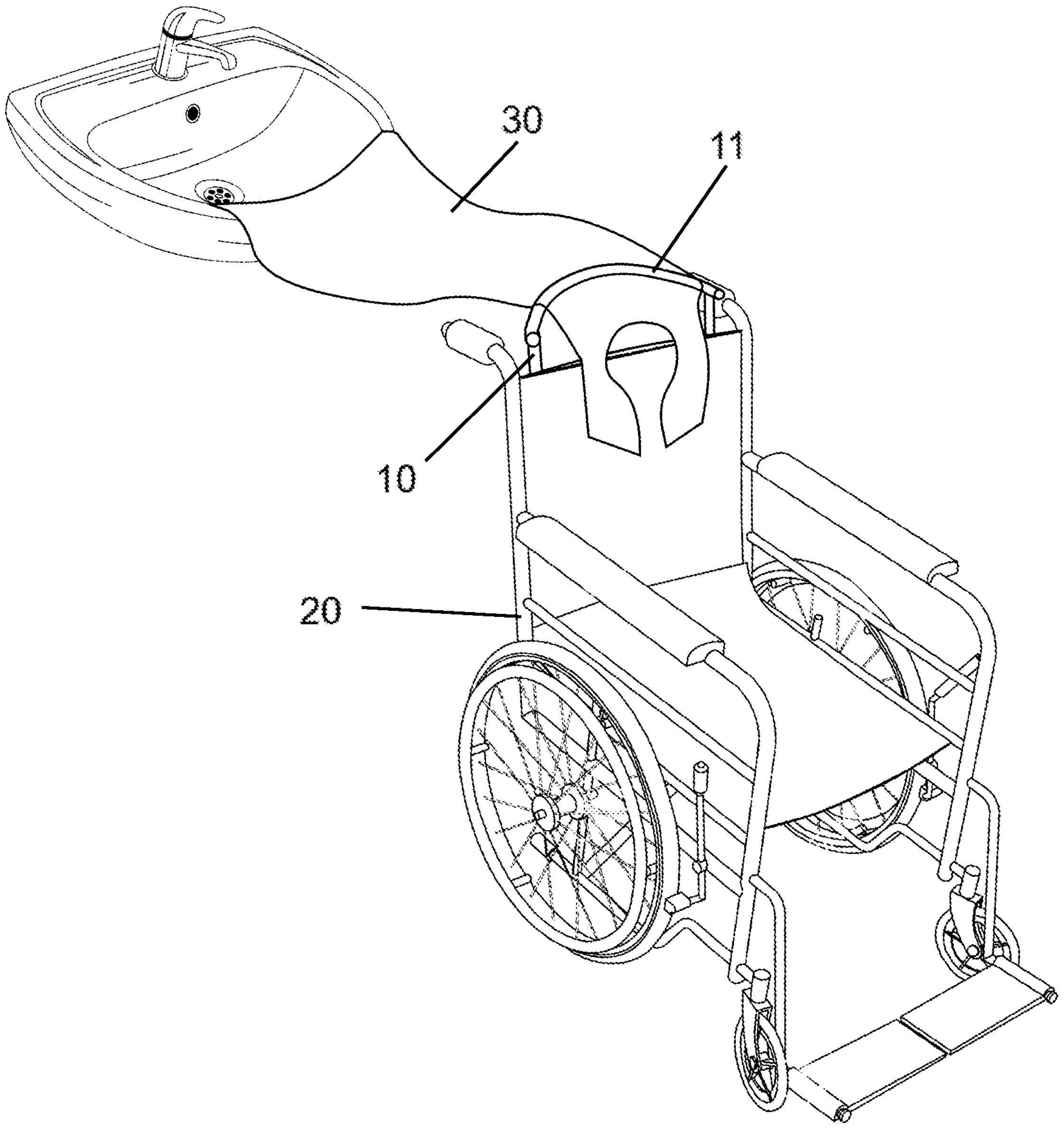
FIG. 1 is a perspective view of the wheelchair grooming aid device as per the present invention, illustrating the wheelchair support brace and the inflatable shampoo cape when assembled and attached to a wheelchair.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention.

As used herein, the term "and/or" includes any combinations of one or more of the associated listed items.

As used herein, the singular forms "a," "an," and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The terminology used herein is for the purpose of describing particular embodiments only and is not intended to be limiting.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

DESCRIPTION OF DRAWINGS

FIG. 1 provides a perspective view of the wheelchair grooming aid device as per the present invention. In this view, the wheelchair support brace (10) is seen to be attached securely to a standard wheelchair (20). The support brace (10) is illustrated with an adjustable rectangular metal frame and includes a curved edge (11) towards the top. The curved edge (11) is designed ergonomically to accommodate and support the back of a client's neck.

The support brace (10) includes a mount at the bottom, securely coupling the brace to the backrest of the wheelchair (20). The mount is adjustable and extendable, designed to fit different types and sizes of wheelchairs, and to adjust the height of the brace (10) as required.

The inflatable shampoo cape (30) is seen attached to the support brace (10). In its uninflated state, the cape (30) rests against the brace (10) and is ready to be positioned around the client's neck when required.

Figure 2:
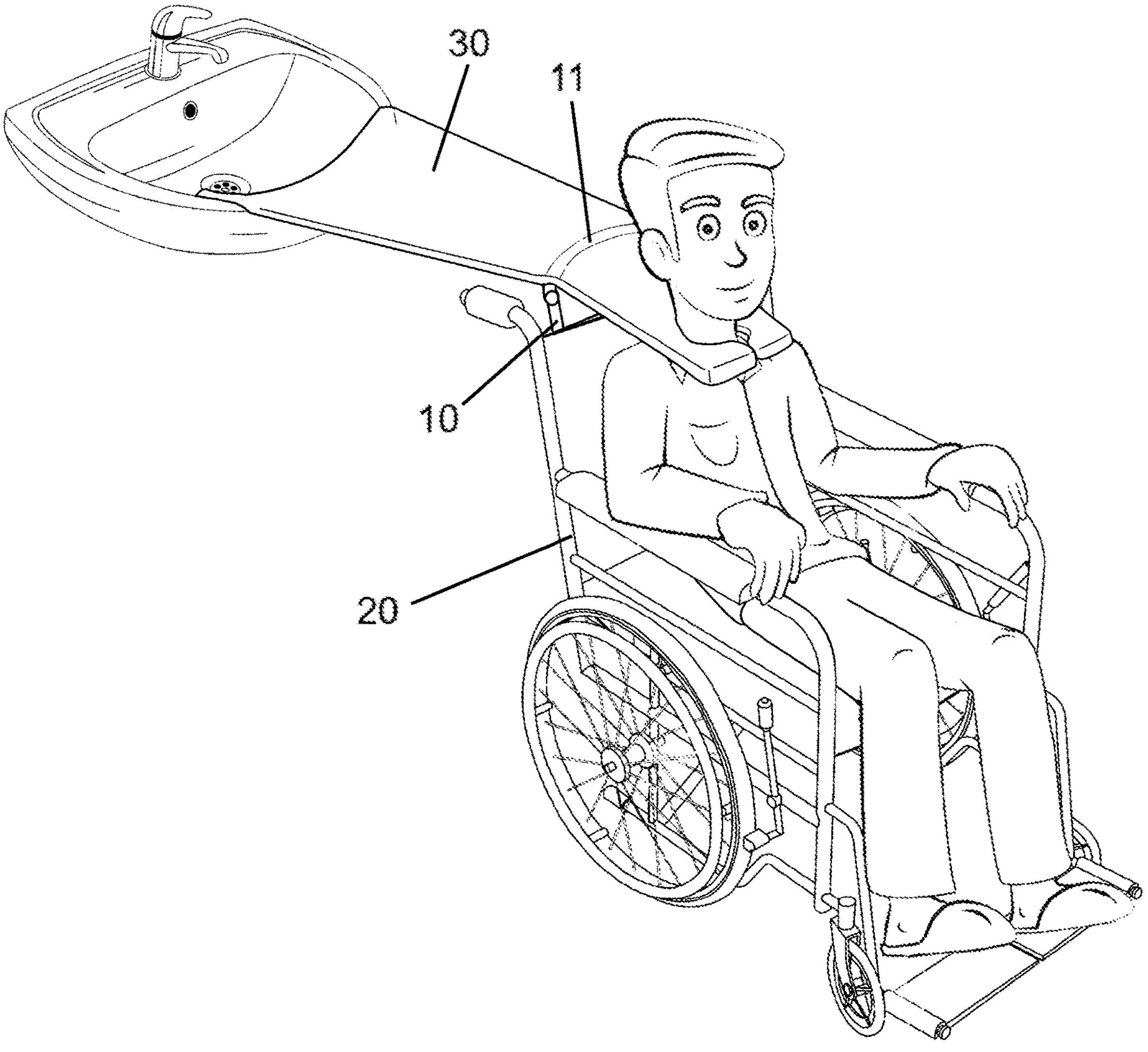
FIG. 2 depicts a similar perspective view as FIG. 1, but with a client seated in the wheelchair, showing the inflated shampoo cape surrounding the client's neck, providing a secure fit and support, and bridging the gap between the client's neck and the sink.

FIG. 2 provides a similar perspective view, with a client seated in the wheelchair (20). The shampoo cape (30) is now inflated and surrounds the client's neck, creating a secure fit and providing sturdy support. The cape (30) bridges the gap between the client's neck and the sink, making it possible to perform a hair washing or grooming service without the need for the client to bend backwards or transfer from their wheelchair.

The curved edge (11) of the support brace (10) fits comfortably against the back of the client's neck, providing an additional support similar to a standard shampoo bowl. The height of the support brace (10) is adjusted such that the inflated cape (30) is at a level appropriate for the sink and comfortable for the client.

The support brace (10) features a rectangular frame structure, predominantly formed from a durable material such as metal or a high-strength plastic. The brace is designed for strength and rigidity, ensuring a stable and sturdy base to support the inflatable shampoo cape (not shown in this figure) during use.

A prominent feature of the support brace (10) is its curved edge (11) at the top. This edge is ergonomically designed to comfortably accommodate and support the back of a client's neck during a hair washing or grooming service. The curvature of the edge (11) mimics the contour of a standard shampoo bowl, providing similar support and comfort for the client.

A mount that is adjustable and extendable couples the brace top the back of a wheelchair allowing the brace to be securely attached to various types and sizes of wheelchairs.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the grooming aid have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A wheelchair grooming aid, comprising:

a. an inflatable shampoo cape configured to surround and support a client's neck, further designed to bridge the gap between the client and a sink or a shampoo bowl when the client is seated in a wheelchair, the cape having the ability to catch hair and product during a hair service;

b. a support brace coupled with the shampoo cape, the support brace constructed to provide a sturdy support base for the cape and the client's neck when attached to a wheelchair;

c. a mount configured to couple the support brace to a wheelchair, the mount being adjustable to accommodate various wheelchair types and sizes and designed to eliminate the gap between the wheelchair and the sink or shampoo bowl; wherein the support brace is adjustable to meet the height requirements of a sink or a client in a wheelchair;

wherein the shampoo cape is inflatable to provide a secure fit and support around a client's head and neck.

2. The wheelchair grooming aid of claim 1, wherein the support brace comprises an adjustable rectangular metal frame with a curved edge, the curved edge designed to ergonomically support the back of a client's neck.

3. The wheelchair grooming aid of claim 2, wherein the mount is configured to couple the ends of the curved edge of the support brace to the top of a wheelchair.

4. The wheelchair grooming aid of claim 1, wherein the mount is adjustable and extendable to fit all wheelchair types and sizes.

5. The wheelchair grooming aid of claim 1, wherein the shampoo cape and support brace are portable and usable at a standalone salon shampoo sink or within a standard kitchen sink.

6. The wheelchair grooming aid of claim 1, wherein the shampoo cape is made of a material selected from the group consisting of vinyl and plastic.

7. A wheelchair grooming aid, comprising an inflatable plastic sheet that forms both a support brace structure and a shampoo cape, the cape designed to surround and support a client's neck and bridge the gap between the client and a sink or a shampoo bowl when the client is seated in a wheelchair.

8. The wheelchair grooming aid of claim 7, wherein the inflatable plastic sheet is adjustable in height to meet the height requirements of a sink or a client in a wheelchair.

9. The wheelchair grooming aid of claim 7, wherein the inflatable plastic sheet is universally adaptable to various wheelchair types and sizes.

* * * * *